(12) United States Patent
Thayalan et al.

(10) Patent No.: US 9,350,680 B2
(45) Date of Patent: May 24, 2016

(54) PROTECTION SWITCHING OVER A VIRTUAL LINK AGGREGATION

(71) Applicant: BROCADE COMMUNICATIONS SYSTEMS, INC., San Jose, CA (US)

(72) Inventors: Prabu Thayalan, Bangalore (IN); Ganesh D. Venkata, San Jose, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 177 days.

(21) Appl. No.: 14/151,693

(22) Filed: Jan. 9, 2014

(65) Prior Publication Data

US 2014/0198636 A1  Jul. 17, 2014

Related U.S. Application Data

(60) Provisional application No. 61/751,808, filed on Jan. 11, 2013.

(51) Int. Cl.
| | | |
|---|---|---|
| *H04L 1/00* | (2006.01) | |
| *H04L 12/891* | (2013.01) | |
| *H04L 12/803* | (2013.01) | |

(52) U.S. Cl.
CPC .............. *H04L 47/41* (2013.01); *H04L 47/125* (2013.01)

(58) Field of Classification Search
USPC ......... 370/228, 389, 422, 401, 400, 255, 386, 370/474, 216, 235, 395.3
See application file for complete search history.

(56) References Cited

U.S. PATENT DOCUMENTS

| | | |
|---|---|---|
| 5,390,173 A | 2/1995 | Spinney |
| 5,802,278 A | 9/1998 | Isfeld |
| 5,878,232 A | 3/1999 | Marimuthu |
| 5,959,968 A | 9/1999 | Chin |

(Continued)

FOREIGN PATENT DOCUMENTS

| | | |
|---|---|---|
| CN | 102801599 A | 11/2012 |
| EP | 0579567 | 5/1993 |

(Continued)

OTHER PUBLICATIONS

Office Action for U.S. Appl. No. 13/030,688, filed Feb. 18, 2011, dated Apr. 25, 2013.

(Continued)

*Primary Examiner* — Chi H Pham
*Assistant Examiner* — Alexander O Boakye
(74) *Attorney, Agent, or Firm* — Shun Yao; Park, Vaughan, Fleming & Dowler LLP

(57) ABSTRACT

One embodiment of the present invention provides a switch. The switch comprises one or more ports and a link management module. The link management module operates a first aggregate link group as an active aggregate link group of a protected virtual link aggregation. This protected virtual link aggregation operates as a single logical channel. An aggregate link group comprises a plurality of logically aggregated links. The first aggregate link group, which represents the logical channel, comprises at least a first port of the one or more ports of the switch. The link management module also operates a second aggregate link group of the protected virtual link aggregation as a standby for the first aggregate link group. The second aggregate link group comprises at least a second port of the one or more ports of the switch. Forwarding is enabled via the first port and disabled via the second port.

21 Claims, 8 Drawing Sheets

(56) References Cited

U.S. PATENT DOCUMENTS

| | | |
|---|---|---|
| 5,973,278 A | 10/1999 | Wehrill, III |
| 5,983,278 A | 11/1999 | Chong |
| 6,041,042 A | 3/2000 | Bussiere |
| 6,085,238 A | 7/2000 | Yuasa |
| 6,104,696 A | 8/2000 | Kadambi |
| 6,185,214 B1 | 2/2001 | Schwartz |
| 6,185,241 B1 | 2/2001 | Sun |
| 6,438,106 B1 | 8/2002 | Pillar |
| 6,542,266 B1 | 4/2003 | Philips |
| 6,633,761 B1 | 10/2003 | Singhal |
| 6,771,610 B1 | 8/2004 | Seaman |
| 6,873,602 B1 | 3/2005 | Ambe |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Singhal |
| 7,016,352 B1 | 3/2006 | Chow |
| 7,173,934 B2 | 2/2007 | Lapuh |
| 7,197,308 B2 | 3/2007 | Singhal |
| 7,206,288 B2 | 4/2007 | Cometto |
| 7,310,664 B1 | 12/2007 | Merchant |
| 7,313,637 B2 | 12/2007 | Tanaka |
| 7,315,545 B1 | 1/2008 | Chowdhury et al. |
| 7,316,031 B2 | 1/2008 | Griffith |
| 7,330,897 B2 | 2/2008 | Baldwin |
| 7,380,025 B1 | 5/2008 | Riggins |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser, Jr. |
| 7,571,447 B2 | 8/2009 | Ally |
| 7,599,901 B2 | 10/2009 | Mital |
| 7,688,736 B2 | 3/2010 | Walsh |
| 7,688,960 B1 | 3/2010 | Aubuchon |
| 7,690,040 B2 | 3/2010 | Frattura |
| 7,706,255 B1 | 4/2010 | Kondrat et al. |
| 7,716,370 B1 | 5/2010 | Devarapalli |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,808,992 B2 | 10/2010 | Homchaudhuri |
| 7,836,332 B2 | 11/2010 | Hara |
| 7,843,906 B1 | 11/2010 | Chidambaram et al. |
| 7,843,907 B1 | 11/2010 | Abou-Emara |
| 7,860,097 B1 | 12/2010 | Lovett |
| 7,898,959 B1 | 3/2011 | Arad |
| 7,924,837 B1 | 4/2011 | Shabtay |
| 7,937,756 B2 | 5/2011 | Kay |
| 7,949,638 B1 | 5/2011 | Goodson |
| 7,957,386 B1 | 6/2011 | Aggarwal |
| 8,018,938 B1 | 9/2011 | Fromm |
| 8,027,354 B1 | 9/2011 | Portolani |
| 8,054,832 B1 | 11/2011 | Shukla |
| 8,068,442 B1 | 11/2011 | Kompella |
| 8,078,704 B2 | 12/2011 | Lee |
| 8,102,781 B2 | 1/2012 | Smith |
| 8,102,791 B2 | 1/2012 | Tang |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,295,921 B2 | 10/2012 | Wang |
| 8,301,686 B1 | 10/2012 | Appajodu |
| 8,339,994 B2 | 12/2012 | Gnanasekaran |
| 8,351,352 B1 | 1/2013 | Eastlake, III |
| 8,369,335 B2 | 2/2013 | Jha |
| 8,369,347 B2 | 2/2013 | Xiong |
| 8,392,496 B2 | 3/2013 | Linden |
| 8,462,774 B2 | 6/2013 | Page |
| 8,467,375 B2 | 6/2013 | Blair |
| 8,520,595 B2 | 8/2013 | Yadav |
| 8,599,850 B2 | 12/2013 | J Ha |
| 8,599,864 B2 | 12/2013 | Chung |
| 8,615,008 B2 | 12/2013 | Natarajan |
| 8,826,385 B2 | 9/2014 | Congdon |
| 2001/0055274 A1 | 12/2001 | Hegge |
| 2002/0019904 A1 | 2/2002 | Katz |
| 2002/0021701 A1 | 2/2002 | Lavian |
| 2002/0091795 A1 | 7/2002 | Yip |
| 2003/0041085 A1 | 2/2003 | Sato |
| 2003/0123393 A1 | 7/2003 | Feuerstraeter |
| 2003/0174706 A1 | 9/2003 | Shankar |
| 2003/0189905 A1 | 10/2003 | Lee |
| 2004/0001433 A1 | 1/2004 | Gram |
| 2004/0010600 A1 | 1/2004 | Baldwin |
| 2004/0049699 A1 | 3/2004 | Griffith |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0213232 A1 | 10/2004 | Regan |
| 2005/0007951 A1 | 1/2005 | Lapuh |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0122979 A1 | 6/2005 | Gross |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0213561 A1 | 9/2005 | Yao |
| 2005/0220096 A1 | 10/2005 | Friskney |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima et al. |
| 2006/0034292 A1 | 2/2006 | Wakayama |
| 2006/0059163 A1 | 3/2006 | Frattura |
| 2006/0062187 A1 | 3/2006 | Rune |
| 2006/0072550 A1 | 4/2006 | Davis |
| 2006/0083254 A1 | 4/2006 | Ge |
| 2006/0098589 A1 | 5/2006 | Kreeger |
| 2006/0168109 A1 | 7/2006 | Warmenhoven |
| 2006/0184937 A1 | 8/2006 | Abels |
| 2006/0221960 A1 | 10/2006 | Borgione |
| 2006/0235995 A1 | 10/2006 | Bhatia |
| 2006/0242311 A1 | 10/2006 | Mai |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2007/0036178 A1 | 2/2007 | Hares |
| 2007/0086362 A1 | 4/2007 | Kato |
| 2007/0094464 A1 | 4/2007 | Sharma |
| 2007/0097968 A1 | 5/2007 | Du |
| 2007/0116224 A1 | 5/2007 | Burke |
| 2007/0116422 A1 | 5/2007 | Reynolds |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0211712 A1 | 9/2007 | Fitch |

(56) References Cited

U.S. PATENT DOCUMENTS

| | | |
|---|---|---|
| 2007/0274234 A1 | 11/2007 | Kubota |
| 2007/0289017 A1 | 12/2007 | Copeland, III |
| 2008/0052487 A1 | 2/2008 | Akahane |
| 2008/0065760 A1 | 3/2008 | Damm |
| 2008/0080517 A1 | 4/2008 | Roy |
| 2008/0101386 A1 | 5/2008 | Gray |
| 2008/0112400 A1 | 5/2008 | Dunbar et al. |
| 2008/0133760 A1 | 6/2008 | Berkvens |
| 2008/0159277 A1 | 7/2008 | Vobbilisetty |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |
| 2008/0267179 A1 | 10/2008 | LaVigne |
| 2008/0285555 A1 | 11/2008 | Ogasahara |
| 2008/0298248 A1 | 12/2008 | Roeck |
| 2008/0310342 A1 | 12/2008 | Kruys |
| 2009/0037607 A1 | 2/2009 | Farinacci |
| 2009/0042270 A1 | 2/2009 | Dolly |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0106405 A1 | 4/2009 | Mazarick |
| 2009/0116381 A1 | 5/2009 | Kanda |
| 2009/0129384 A1 | 5/2009 | Regan |
| 2009/0138577 A1 | 5/2009 | Casado |
| 2009/0138752 A1 | 5/2009 | Graham |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1 | 9/2009 | Kostal |
| 2009/0245137 A1 | 10/2009 | Hares |
| 2009/0245242 A1 | 10/2009 | Carlson |
| 2009/0246137 A1 | 10/2009 | Hadida |
| 2009/0252049 A1 | 10/2009 | Ludwig |
| 2009/0260083 A1 | 10/2009 | Szeto |
| 2009/0279558 A1 | 11/2009 | Davis |
| 2009/0292858 A1 | 11/2009 | Lambeth |
| 2009/0316721 A1 | 12/2009 | Kanda |
| 2009/0323708 A1 | 12/2009 | Ihle |
| 2009/0327392 A1 | 12/2009 | Tripathi |
| 2009/0327462 A1 | 12/2009 | Adams |
| 2010/0027420 A1 | 2/2010 | Smith |
| 2010/0054260 A1 | 3/2010 | Pandey |
| 2010/0061269 A1 | 3/2010 | Banerjee |
| 2010/0074175 A1 | 3/2010 | Banks |
| 2010/0097941 A1 | 4/2010 | Carlson |
| 2010/0103813 A1 | 4/2010 | Allan |
| 2010/0103939 A1 | 4/2010 | Carlson |
| 2010/0131636 A1 | 5/2010 | Suri |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0257263 A1 | 10/2010 | Casado |
| 2010/0271960 A1 | 10/2010 | Krygowski |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0287262 A1 | 11/2010 | Elzur |
| 2010/0287548 A1 | 11/2010 | Zhou |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0329110 A1 | 12/2010 | Rose |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0064086 A1 | 3/2011 | Xiong |
| 2011/0064089 A1 | 3/2011 | Hidaka |
| 2011/0072208 A1 | 3/2011 | Gulati |
| 2011/0085560 A1 | 4/2011 | Chawla |
| 2011/0085563 A1 | 4/2011 | Kotha |
| 2011/0110266 A1 | 5/2011 | Li |
| 2011/0134802 A1 | 6/2011 | Rajagopalan |
| 2011/0134803 A1 | 6/2011 | Dalvi |
| 2011/0134925 A1 | 6/2011 | Safrai |
| 2011/0142053 A1 | 6/2011 | Van Der Merwe |
| 2011/0142062 A1 | 6/2011 | Wang |
| 2011/0161494 A1 | 6/2011 | Mcdysan |
| 2011/0161695 A1 | 6/2011 | Okita |
| 2011/0188373 A1 | 8/2011 | Saito |
| 2011/0194403 A1 | 8/2011 | Sajassi |
| 2011/0194563 A1 | 8/2011 | Shen |
| 2011/0228780 A1 | 9/2011 | Ashwood-Smith |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268120 A1 | 11/2011 | Vobbilisetty |
| 2011/0273988 A1 | 11/2011 | Tourrilhes |
| 2011/0274114 A1 | 11/2011 | Dhar |
| 2011/0280572 A1 | 11/2011 | Vobbilisetty |
| 2011/0286457 A1 | 11/2011 | En |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Da Silva |
| 2012/0033669 A1 | 2/2012 | Mohandas |
| 2012/0075991 A1 | 3/2012 | Sugita |
| 2012/0099602 A1 | 4/2012 | Nagapudi |
| 2012/0106339 A1 | 5/2012 | Mishra |
| 2012/0131097 A1 | 5/2012 | Baykal |
| 2012/0131289 A1 | 5/2012 | Taguchi |

(56) References Cited

U.S. PATENT DOCUMENTS

| | | |
|---|---|---|
| 2012/0158997 A1 | 6/2012 | Hsu |
| 2012/0163164 A1 | 6/2012 | Terry |
| 2012/0177039 A1 | 7/2012 | Berman |
| 2012/0243539 A1 | 9/2012 | Keesara |
| 2012/0275347 A1 | 11/2012 | Banerjee |
| 2012/0294192 A1 | 11/2012 | Masood |
| 2012/0294194 A1 | 11/2012 | Balasubramanian |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1* | 1/2013 | Sarwar ............... H04L 49/351 370/228 |
| 2013/0003737 A1 | 1/2013 | Sinicrope |
| 2013/0028072 A1 | 1/2013 | Addanki |
| 2013/0034015 A1 | 2/2013 | Jaiswal |
| 2013/0067466 A1 | 3/2013 | Combs |
| 2013/0070762 A1 | 3/2013 | Adams |
| 2013/0114595 A1 | 5/2013 | Mack-Crane et al. |
| 2013/0127848 A1 | 5/2013 | Joshi |
| 2013/0194914 A1 | 8/2013 | Agarwal |
| 2013/0219473 A1 | 8/2013 | Schaefer |
| 2013/0250951 A1 | 9/2013 | Koganti |
| 2013/0259037 A1 | 10/2013 | Natarajan |
| 2013/0272135 A1 | 10/2013 | Leong |
| 2014/0105034 A1 | 4/2014 | Huawei |

FOREIGN PATENT DOCUMENTS

| | | |
|---|---|---|
| EP | 1398920 A2 | 3/2004 |
| EP | 1916807 A2 | 4/2008 |
| EP | 2001167 A1 | 12/2008 |
| WO | 2009042919 | 4/2009 |
| WO | 2010111142 A1 | 9/2010 |
| WO | 2014031781 | 2/2014 |

OTHER PUBLICATIONS

Office Action for U.S. Appl. No. 13/044,301, filed Mar. 9, 2011, dated Jun. 11, 2013.
Office Action for U.S. Appl. No. 13/044,301, filed Mar. 9, 2011, dated Feb. 22, 2013.
Office Action for U.S. Appl. No. 13/050,102, filed Oct. 26, 2012, dated Oct. 26, 2012.
Office Action for U.S. Appl. No. 13/050,102, filed May 16, 2013, date May 16, 2013.
Office Action for U.S. Appl. No. 13/184,526, filed Jul. 16, 2011, dated Jan. 28, 2013.
Office Action for U.S. Appl. No. 13/184,526, filed May 22, 2013, dated May 22, 2013.
Office Action for U.S. Appl. No. 13/092,873, filed Apr. 22, 2011, dated Jun. 19, 2013.
Office Action for U.S. Appl. No. 13/365,993, filed Feb. 3, 2012, dated Jul. 23, 2013.
Office Action for U.S. Appl. No. 13/365,808, filed Jul. 18, 2013, dated Jul. 18, 2013.
Office Action for U.S. Appl. No. 13/312,903, filed Dec. 6, 2011, dated Jun. 13, 2013.
Rosen, E. et al., "BGP/MPLS VPNs", Mar. 1999.
Office Action for U.S. Appl. No. 14/577,785, filed Dec. 19, 2014, dated Apr. 13, 2015.
Office Action for U.S. Appl. No. 13/786,328, filed Mar. 5, 2013, dated Mar. 13, 2015.
Office Action for U.S. Appl. No. 13/425,238, filed Mar. 20, 2012, dated Mar. 12, 2015.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Apr. 9, 2014, U.S. Appl. No. 13/092,724, filed Apr. 22, 2011.
Office action dated Feb. 5, 2013, U.S. Appl. No. 13/092,724, filed Apr. 22, 2011.
Office action dated Jan. 10, 2014, U.S. Appl. No. 13/092,580, filed Apr. 22, 2011.
Office action dated Jun. 10, 2013, U.S. Appl. No. 13/092,580, filed Apr. 22, 2011.
Office action dated Jan. 16, 2014, U.S. Appl. No. 13/042,259, filed Mar. 7, 2011.
Office action dated Mar. 18, 2013, U.S. Appl. No. 13/042,259, filed Mar. 7, 2011.
Office action dated Jul. 31, 2013, U.S. Appl. No. 13/042,259, filed Mar. 7, 2011.
Office action dated Aug. 29, 2014, U.S. Appl. No. 13/042,259, filed Mar. 7, 2011.
Office action dated Mar. 14, 2014, U.S. Appl. No. 13/092,460, filed Apr. 22, 2011.
Office action dated Jun. 21, 2013, U.S. Appl. No. 13/092,460, filed Apr. 22, 2011.
Office action dated Jan. 28, 2013, U.S. Appl. No. 13/092,701, filed Apr. 22, 2011.
Office action dated Mar. 26, 2014, U.S. Appl. No. 13/092,701, filed Apr. 22, 2011.
Office action dated Jul. 3, 2013, U.S. Appl. No. 13/092,701, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Jan. 6, 2014, U.S. Appl. No. 13/092,877, filed Apr. 22, 2011.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Oct. 2, 2013, U.S. Appl. No. 13/044,326, filed Mar. 9, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.

(56) References Cited

OTHER PUBLICATIONS

Office action dated Jan. 28, 2013, U.S. Appl. No. 13/148,526, filed Jul. 16, 2011.
Office action dated Dec. 2, 2013, U.S. Appl. No. 13/184,526, filed Jul. 16, 2011.
Office action dated May 22, 2013, U.S. Appl. No. 13/148,526, filed Jul. 16, 2011.
Office action dated Aug. 21, 2014, U.S. Appl. No. 13/184,526, filed Jul. 16, 2011.
Office action dated Nov. 29, 2013, U.S. Appl. No. 13/092,873, filed Apr. 22, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office Action dated Mar. 6, 2014, U.S. Appl. No. 13/425,238, filed Mar. 20, 2012.
Office action dated Nov. 12, 2013, U.S. Appl. No. 13/312,903, filed Dec. 6, 2011.
Office action dated Jun. 13, 2013, U.S. Appl. No. 13/312,903, filed Dec. 6, 2011.
Office Action dated Jun. 18, 2014, U.S. Appl. No. 13/440,861, filed Apr. 5, 2012.
Office Action dated Feb. 28, 2014, U.S. Appl. No. 13/351,513, filed Jan. 17, 2012.
Office Action dated May 9, 2014, U.S. Appl. No. 13/484,072, filed May 30, 2012.
Office Action dated May 14, 2014, U.S. Appl. No. 13/533,843, filed Jun. 26, 2012.
Office Action dated Feb. 20, 2014, U.S. Appl. No. 13/598,204, filed Aug. 29, 2012.
Office Action dated Jun. 6, 2014, U.S. Appl. No. 13/669,357, filed Nov. 5, 2012.
Huang, Nen-Fu et al., 'An Effective Spanning Tree Algorithm for a Bridged LAN', Mar. 16, 1992.
Office Action for U.S. Appl. No. 13/351,513, filed Jan. 17, 2012, Peter P., dated Feb. 28, 2014.
Office Action for U.S. Appl. No. 13/533,843, filed Jun. 26, 2012, Chi Ho A., dated Oct. 21, 2013.
Zhai F. Hu et al. 'RBridge: Pseudo-Nickname; draft-hu-trill-pseudonode-nickname-02.txt', May 15, 2012.
Office action dated Aug. 4, 2014, U.S. Appl. No. 13/050,102, filed Mar. 17, 2011.
Perlman, Radia et al., 'RBridges: Base Protocol Specification; Draft-ietf-trill-rbridge-protocol-16.txt', Mar. 3, 2010, pp. 1-117.
'An Introduction to Brocade VCS Fabric Technology', BROCADE white paper, http://community.brocade.com/docs/DOC-2954, Dec. 3, 2012.
U.S. Appl. No. 13/030,806 Office Action dated Dec. 3, 2012.
Office Action dated Apr. 9, 2014, U.S. Appl. No. 13/092,752, filed Apr. 22, 2011.
Brocade 'Brocade Unveils' The Effortless Network, http://newsroom.brocade.com/press-releases/brocade-unveils-the-effortless-network-nasdaq-brcd-0859535, 2012.
Kreeger, L. et al., 'Network Virtualization Overlay Control Protocol Requirements draft-kreeger-nvo3-overlay-cp-00', Jan. 30, 2012.
Lapuh, Roger et al., 'Split Multi-link Trunking (SMLT)', draft-lapuh-network-smlt-08, Jul. 2008.
Office Action for U.S. Appl. No. 13/365,993, filed Feb. 3, 2012, from Cho, Hong Sol., dated Jul. 23, 2013.
Office Action for U.S. Appl. No. 12/950,974, filed Nov. 19, 2010, dated Dec. 20, 2012.
Office Action for U.S. Appl. No. 13/092,877, filed Apr. 22, 2011, dated Sep. 5, 2013.
Office Action for U.S. Appl. No. 13/092,887, dated Jan. 6, 2014.
Office Action for U.S. Appl. No. 13/098,490, filed May 2, 2011, dated Mar. 27, 2014.
Office Action for U.S. Appl. No. 13/092,873, filed Apr. 22, 2011, dated Nov. 29, 2013.
Office Action for U.S. Appl. No. 13/184,526, filed Jul. 16, 2011, dated Dec. 2, 2013.
Office Action for U.S. Appl. No. 13/598,204, filed Aug. 29, 2012, dated Feb. 20, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/351,513, filed Jan. 17, 2012, dated Jul. 24, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for U.S. Appl. No. 13/950,974, filed Nov. 19, 2010, from Haile, Awet A., dated Dec. 2, 2012.
Perlman R: 'Challenges and opportunities in the design of TRILL: a routed layer 2 technology', 2009 IEEE Globecom Workshops, Honolulu, HI, USA, Piscataway, NJ, USA, Nov. 30, 2009, pp. 1-6, XP002649647, DOI: 10.1109/Globecom.2009.5360776 ISBN: 1-4244-5626-0 [retrieved on Jul. 19, 2011].
TRILL Working Group Internet-Draft Intended status: Proposed Standard RBridges: Base Protocol Specificaiton Mar. 3, 2010.
Office action dated Aug. 14, 2014, U.S. Appl. No. 13/092,460, filed Apr. 22, 2011.
Office action dated Jul. 7, 2014, for U.S. Appl. No. 13/044,326, filed Mar. 9, 2011.
Office Action dated Dec. 19, 2014, for U.S. Appl. No. 13/044,326, filed Mar. 9, 2011.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/044,301, dated Mar. 9, 2011.
Office Action for U.S. Appl. No. 13/184,526, filed Jul. 16, 2011, dated Jan. 5, 2015.
Office Action for U.S. Appl. No. 13/598,204, filed Aug. 29, 2012, dated Jan. 5, 2015.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/092,460, filed Apr. 22, 2011, dated Mar. 13, 2015.
Office Action for U.S. Appl. No. 13/425,238, dated Mar. 12, 2015.
Office Action for U.S. Appl. No. 13/092,752, filed Apr. 22, 2011, dated Feb. 27, 2015.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office action dated Oct. 2, 2014, for U.S. Appl. No. 13/092,752, filed Apr. 22, 2011.
Kompella, Ed K. et al., 'Virtual Private LAN Service (VPLS) Using BGP for Auto-Discovery and Signaling' Jan. 2007.
Mahalingam "VXLAN: A Framework for Overlaying Virtualized Layer 2 Networks over Layer 3 Networks" Oct. 17, 2013 pp. 1-22, Sections 1, 4 and 4.1.

(56) References Cited

OTHER PUBLICATIONS

Office action dated Apr. 30, 2015, U.S. Appl. No. 13/351,513, filed Jan. 17, 2012.
Office Action dated Apr. 1, 2015, U.S. Appl. No. 13/656,438, filed Oct. 19, 2012.
Office Action dated May 21, 2015, U.S. Appl. No. 13/288,822, filed Nov. 3, 2011.
Siamak Azodolmolky et al. "Cloud computing networking: Challenges and opportunities for innovations", IEEE Communications Magazine, vol. 51, No. 7, Jul. 1, 2013.
Office Action dated Apr. 1, 2015 U.S. Appl. No. 13/656,438, filed Oct. 19, 2012.
Office action dated Jun. 8, 2015, U.S. Appl. No. 14/178,042, filed Feb. 11, 2014.
Office Action Dated Jun. 10, 2015, U.S. Appl. No. 13/890,150, filed May 8, 2013.
Office Action dated Jun. 18, 215, U.S. Appl. No. 13/098,490, filed May 2, 2011.
Office Action dated Jun. 16, 2015, U.S. Appl. No. 13/048,817, filed Mar. 15, 2011.
Narten, T. et al. "Problem Statement: Overlays for Network Virtualization draft-narten-nvo3-overlay-problem-statement-01", Oct. 31, 2011.
Knight, Paul et al. "Layer 2 and 3 Virtual Private Networks: Taxonomy, Technology, and Standardization Efforts", 2004.
An Introduction to Brocade VCS Fabric Technology, Dec. 3, 2012.
Kreeger, L. et al. "Network Virtualization Overlay Control Protocol Requirements draft-kreeger-nvo3-overlay-cp-00", Aug. 2, 2012.
Knight, Paul et al., "Network based IP VPN Architecture using Virtual Routers", May 2003.
Louati, Wajdi et al., "Network-Based Virtual Personal Overlay Networks Using Programmable Virtual Routers", 2005.
Brocade Unveils "The Effortless Network", 2009.
The Effortless Network: HyperEdge Technology for the Campus LAN, 2012.
Foundary FastIron Configuration Guide, Software Release FSX 04.2.00b, Software Release FWS 04.3.00, Software Release FGS 05.0.00a, 2008.
FastIron and Turbulron 24x Configuration Guide, 2010.
FastIron Configuration Guide, Supporting IronWare Software Release 07.0.00, 2009.
Christensen, M. et al., Considerations for Internet Group Management Protocol (IGMP) and Multicast Listener Discovery (MLD) Snooping Switches, 2006.
Perlman, Radia et al. "RBridges: Base Protocol Specification", <draft-ietf-trill-rbridge-protocol-16.txt>, 2010.
Brocade Fabric OS (FOS) 6.2 Virtual Fabrics Feature Frequently Asked Questions, 2009.
Eastlake III, Donald et al., "RBridges: TRILL Header Options", 2009.
Perlman, Radia "Challenges and Opportunities in the Design of TRILL: a Routed layer 2 Technology", 2009.
Perlman, Radia et al., "RBridge VLAN Mapping", <draft-ietf-trill-rbridge-vlan-mapping-01.txt>, 2009.
Knight, S. et al., "Virtual Router Redundancy Protocol", 1998.
"Switched Virtual Internetworking moves beyond bridges and routers", 8178 Data Communications 23(1994) September, No. 12.
Touch, J. et al., "Transparent Interconnection of Lots of Links (TRILL): Problem and Applicability Statement", 2009.
Lapuh, Roger et al., "Split Multi-link Trunking (SMLT)", 2002.
Lapuh, Roger et al., "Split Multi-Link Trunking (SMLT) draft-Lapuh-network-smlt-08", 2009.
Nadas, S. et al., "Virtual Router Redundancy Protocol (VRRP) Version 3 for IPv4 and IPv6", 2010.
Office Action for U.S. Appl. No. 12/725,249, filed Mar. 16, 2010, dated Sep. 12, 2012.
Office Action for U.S. Appl. No. 12/725,249, filed Mar. 16, 2010, dated Apr. 26, 2013.
Office Action for U.S. Appl. No. 13/087,239, filed Apr. 14, 2011, dated Dec. 5, 2012.
Office Action for U.S. Appl. No. 13/087,239, filed Apr. 14, 2011, dated May 22, 2013.
Office Action for U.S. Appl. No. 13/098,490, filed May 2, 2011, dated Dec. 21, 2012.
Office Action for U.S. Appl. No. 13/098,490, filed May 2, 2011, dated Jul. 9, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,580, filed Apr. 22, 2011, dated Jun. 10, 2013.
Office Action for U.S. Appl. No. 13/042,259, filed Mar. 7, 2011, dated Mar. 18, 2013.
Office Action for U.S. Appl. No. 13/092,460, filed Apr. 22, 2011, dated Jun. 21, 2013.
Office Action for U.S. Appl. No. 13/042,259, filed Mar. 7, 2011, dated Jul. 31, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,752, filed Apr. 22, 2011, dated Feb. 5, 2013.
Office Action for U.S. Appl. No. 13/092,752, filed Apr. 22, 2011, dated Jul. 18, 2013.
Office Action for U.S. Appl. No. 13/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/092,877, filed Apr. 22, 2011, dated Mar. 4, 2013.
Office Action for U.S. Appl. No. 13/902,877, filed Apr. 22, 2011, dated Sep. 5, 2013.
Office Action for U.S. Appl. No. 12/950,968, filed Nov. 19, 2010, dated Jun. 7, 2012.
Office Action for U.S. Appl. No. 12/950,968, filed Nov. 19, 2010, dated Jan. 4, 2013.
Office Action for U.S. Appl. No. 13/092,864, filed Apr. 22, 2011, dated Sep. 19, 2012.
Office Action for U.S. Appl. No. 13/098,360, filed Apr. 29, 2011, dated May 31, 2013.
Office Action for U.S. Appl. No. 13/044,326, filed Mar. 9, 2011, dated Oct. 2, 2013.
Office Action for U.S. Appl. No. 13/030,806, filed Feb. 18, 2011, dated Dec. 3, 2012.
Office Action for U.S. Appl. No. 13/030,806, filed Feb. 18, 2011, dated Jun. 11, 2013.

* cited by examiner

PROTECTION SWITCHING OVER A VIRTUAL LINK AGGREGATION

RELATED APPLICATIONS

This application claims the benefit of U.S. Provisional Application No. 61/751,808, titled "Protection Switching in Distributed Link Aggregation," by inventors Prabu Thayalan and Ganesh D. Venkata, filed 11 Jan. 2013, the disclosure of which is incorporated by reference herein.

The present disclosure is related to U.S. patent application Ser. No. 13/087,239, titled "Virtual Cluster Switching," by inventors Suresh Vobbilisetty and Dilip Chatwani, filed 14 Apr. 2011, and U.S. patent application Ser. No. 12/725,249, titled "Redundant Host Connection in a Routed Network," by inventors Somesh Gupta, Anoop Ghanwani, Phanidhar Koganti, and Shunjia Yu, filed 16 Mar. 2010, the disclosures of which are incorporated by reference herein.

BACKGROUND

1. Field

The present disclosure relates to network management. More specifically, the present disclosure relates to a method and system for providing protection switching for virtual link aggregations (VLAGs).

2. Related Art

The exponential growth of the Internet has made it a popular delivery medium for multimedia applications, such as video on demand and television. Such applications have brought with them an increasing demand for bandwidth. As a result, equipment vendors race to build larger and faster switches with versatile capabilities, such as multicasting, to move more traffic efficiently. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

As more time-critical applications are being implemented in data communication networks, high-availability operation is becoming progressively more important as a value proposition for network architects. It is often desirable to aggregate links to multiple switches to operate as a single logical link (referred to as a virtual link aggregation or a multi-chassis trunk) to facilitate load balancing among the multiple switches while providing redundancy to ensure that a device failure or link failure would not affect the data flow. A switch participating in a virtual link aggregation can be referred to as a partner switch of the virtual link aggregation.

Currently, such virtual link aggregations in a network have not been able to take advantage of the protection switching available for a typical switch. Multiple switches in a network can operate in conjunction with each other to provide protection switching. Consequently, an end device coupled to multiple such switches can typically continue to exchanges data packets with one of the switches in the event of a failure (e.g., a link or a node failure). However, such failure leads to removal of learned information via the port associated with the failure. Hence, the switch needs to relearn all information again and the layer-2 spanning tree requires reconstruction. As a result, the switch is burdened with additional overhead.

While virtual link aggregation brings many desirable features to networks, some issues remain unsolved in efficient protection switching.

SUMMARY

One embodiment of the present invention provides a switch. The switch comprises one or more ports and a link management module. The link management module operates a first aggregate link group as an active aggregate link group of a protected virtual link aggregation. This protected virtual link aggregation operates as a single logical channel. An aggregate link group comprises a plurality of logically aggregated links. The first aggregate link group, which represents the logical channel, comprises at least a first port of the one or more ports of the switch. The link management module also operates a second aggregate link group of the protected virtual link aggregation as a standby for the first aggregate link group. The second aggregate link group comprises at least a second port of the one or more ports of the switch. Forwarding is enabled via the first port and disabled via the second port.

In a variation on this embodiment, a respective aggregate link group is a virtual link aggregation associated with the switch and a remote switch, wherein the virtual link aggregation operates as a single logical channel.

In a variation on this embodiment, the link management module determines the first aggregate link group as the active aggregate link group based on one or more of: (i) configuration of the first aggregate link group as the active aggregate link group, and (ii) dynamic selection of the first aggregate link group as the active aggregate link group based on a criteria.

In a variation on this embodiment, a respective aggregate link group comprises logically aggregated links coupled to a respective end device.

In a variation on this embodiment, forwarding is enabled via the first port based on one or more of: (i) setting the first port in a forwarding state, and (ii) setting the first port in an operationally up state. Forwarding is disabled via the second port based on one or more of: (i) setting the second port in a standby state, and (ii) setting the second port in an operationally down state.

In a variation on this embodiment, the switch also includes a protection switching module which detects an unavailability associated with the first aggregate link group based on an unavailability criterion. If the protection switching module detects the unavailability, the protection switching module enables forwarding via the second port. The second group starts representing the logical channel corresponding to the protected virtual link aggregation.

In a further variation, the unavailability criterion is based on one or more of: (i) minimum number of active link in a link aggregation group, and (ii) minimum aggregate bandwidth of a link aggregation group.

In a further variation, if the protection switching module detects a recovery from the unavailability, the protection switching module pre-empts traffic from the second port, enables forwarding via the first port, thereby enabling traffic forwarding via the first aggregate link group, and disables forwarding via the second port, thereby disabling traffic forwarding via the second aggregate link group.

In a further variation, if the protection switching module detects a recovery from the unavailability, the protection switching module continues forwarding via the second port, the second group continues to represent the logical channel corresponding to the protected virtual link aggregation, and operates the first aggregate link group as a standby for the second aggregate link group. Under such a scenario, forwarding is disabled via the first port.

In a variation on this embodiment, the switch is a member of an Ethernet fabric switch, which incorporates a plurality of physical switches coupled in an arbitrary topology logically operating as a single switch. The switch is associated with an identifier of the Ethernet fabric switch.

BRIEF DESCRIPTION OF THE FIGURES

In the figures, like reference numerals refer to the same figure elements.

DETAILED DESCRIPTION

Figure 1A:
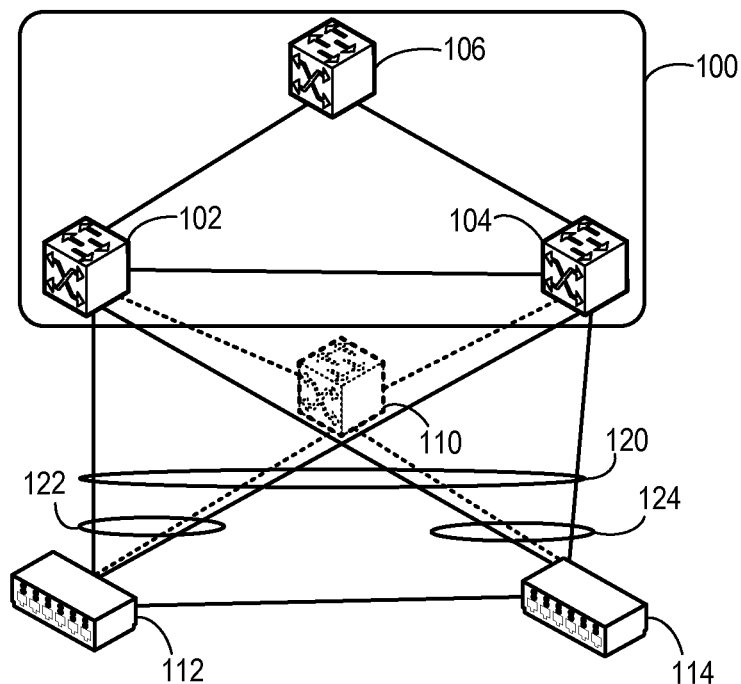
FIG. 1A illustrates an exemplary protected virtual link aggregation comprising virtual link aggregations, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of providing efficient protection switching in a virtual link aggregation is solved by creating a protected virtual link aggregation comprising an active group and at least one other standby link aggregation group (can be referred to as groups). Links in the active group actively forward traffic via the virtual link aggregation, and the standby group(s) remain standby and can become active if the active group fails. A link in a virtual link aggregation can also be identified by a port associated with that link. In this disclosure, the terms "link" and "port" are used interchangeably to indicate participation in a virtual link aggregation.

Links in a virtual link aggregation form a single logical channel. With existing technologies, a respective link in a virtual link aggregation actively forwards traffic. In the virtual link aggregation, if a link or a switch becomes unavailable (e.g., due to a failure), the virtual link aggregation as a single logical channel can become unavailable. As a result, a respective partner switch of the virtual link aggregation needs to flush (i.e., remove) the information learned via the virtual link aggregation and relearn the flushed information again. Furthermore, if the partner switches are participating in a layer-2 spanning tree (e.g., based on Spanning Tree Protocol (STP), Rapid STP (RSTP), or Multiple STP (MSTP)) via the virtual link aggregation, the unavailability causes a respective partner switch need to reconstruct the spanning tree. As a result, the respective partner switches are burdened with additional overhead.

This problem can further aggravate if the partner switches are member switches of a fabric switch. In a fabric switch, any number of switches coupled in an arbitrary topology may logically operate as a single switch. To do so, the member switches of a fabric switch share learned information among each other. If a partner switch flushes information learned via the virtual link aggregation due to the unavailability, a respective member switch of the fabric switch also flushes that information. Furthermore, if the fabric switch supports layer-2 spanning tree, the fabric switch, as a single switch, may need to reconstruct the spanning tree. Consequently, a respective port of a respective member switch may need reconfiguration (e.g., determining whether the port is going to be in a forward state or a discarding state), which can lead to significant overhead in the fabric switch.

To solve this problem, a protected virtual link aggregation is formed comprising a plurality of link aggregation groups, each capable of meeting the requirements (e.g., bandwidth requirement) of the protected virtual link aggregation. In some embodiments, links of protected virtual link aggregation which are coupled to the same end device are logically aggregated to form a group. Among these groups, one group operates as the active group which forwards traffic via the protected virtual link aggregation and represent the logical channel corresponding to the protected virtual link aggregation. In some embodiments, only the active group actively represents the logical channel. Hence, the other groups operate as stand-by groups which do not forward traffic, thereby do not actively represent the logical channel.

However, a respective group is associated with the same protected virtual link aggregation (e.g., shares the same identifiers associated with the protected virtual link aggregation) and can individually (and mutually exclusively) represent the logical channel corresponding to the protected virtual link aggregation. In other words, a respective group individually can operate as if the group is representative of the logical channel corresponding to the protected virtual link aggregation. If the active group becomes unavailable, one of the standby groups starts operating as the active group, thereby representing the logical channel (e.g., using the same identifiers associated with the protected virtual link aggregation). As a result, other switches in the network may remain oblivious to the unavailability and the protected virtual link aggregation can continue to operate without triggering a learned information flush or spanning tree reconstruction in the network.

In some embodiments, the partner switches are member switches of a fabric switch. An end device can be coupled to the fabric switch via a virtual link aggregation. A fabric switch in the network can be an Ethernet fabric switch or a virtual cluster switch (VCS). In an Ethernet fabric switch, any number of switches coupled in an arbitrary topology may logically operate as a single switch. Any new switch may join or leave the fabric switch in "plug-and-play" mode without any manual configuration. In some embodiments, a respective switch in the Ethernet fabric switch is a Transparent Interconnection of Lots of Links (TRILL) routing bridge (RBridge). A fabric switch appears as a single logical switch to the end device.

A fabric switch runs a control plane with automatic configuration capabilities (such as the Fibre Channel control plane) over a conventional transport protocol, thereby allowing a number of switches to be inter-connected to form a single, scalable logical switch without requiring burdensome manual configuration. As a result, one can form a large-scale logical switch using a number of smaller physical switches. The automatic configuration capability provided by the control plane running on each physical switch allows any number of switches to be connected in an arbitrary topology without requiring tedious manual configuration of the ports and links. This feature makes it possible to use many smaller, inexpensive switches to construct a large fabric switch, which can be viewed and operated as a single switch (e.g., as a single Ethernet switch).

It should be noted that a fabric switch is not the same as conventional switch stacking. In switch stacking, multiple switches are interconnected at a common location (often within the same rack), based on a particular topology, and manually configured in a particular way. These stacked switches typically share a common address, e.g., IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a fabric switch can include an arbitrary number of switches with individual addresses, can be based on an arbitrary topology, and does not require extensive manual configuration. The switches can reside in the same location, or be distributed over different locations. These features overcome the inherent limitations of switch stacking and make it possible to build a large "switch farm" which can be treated as a single, logical switch. Due to the automatic configuration capabilities of the fabric switch, an individual physical switch can dynamically join or leave the fabric switch without disrupting services to the rest of the network.

Furthermore, the automatic and dynamic configurability of fabric switch allows a network operator to build its switching system in a distributed and "pay-as-you-grow" fashion without sacrificing scalability. The fabric switch's ability to respond to changing network conditions makes it an ideal solution in a virtual computing environment, where network loads often change with time.

Although the present disclosure is presented using examples based on spanning tree protocols, embodiments of the present invention are not limited to spanning trees. Embodiments of the present invention are relevant to any networking technique which allows loop-less forwarding in a layer-2 network. In this disclosure, the term "spanning tree" is used in a generic sense, and can refer to any loop-free network topology.

The term "RBridge" refers to routing bridges, which are bridges implementing the TRILL protocol as described in Internet Engineering Task Force (IETF) Request for Comments (RFC) "Routing Bridges (RBridges): Base Protocol Specification," available at http://tools.ietf.org/html/rfc6325, which is incorporated by reference herein. Embodiments of the present invention are not limited to application among RBridges. Other types of switches, routers, and forwarders can also be used.

In this disclosure, the term "end device" can refer to a physical or virtual host machine, a conventional switch, or any other type of network device. Additionally, an end device can be coupled to other switches or hosts further away from a network. An end device can also be an aggregation point for a number of switches to enter the network.

The term "switch identifier" refers to a group of bits that can be used to identify a switch. In a layer-2 communication, the switch identifier can be a media access control (MAC) address. If a switch is an RBridge, the switch identifier can be referred to as an "RBridge identifier." Note that the TRILL standard uses "RBridge ID" to denote a 48-bit intermediate-system-to-intermediate-system (IS-IS) System ID assigned to an RBridge, and "RBridge nickname" to denote a 16-bit value that serves as an abbreviation for the "RBridge ID." In this disclosure, "switch identifier" is used as a generic term and is not limited to any bit format, and can refer to any format that can identify a switch. The term "RBridge identifier" is also used in a generic sense and is not limited to any bit format, and can refer to "RBridge ID" or "RBridge nickname" or any other format that can identify an RBridge.

The term "frame" refers to a group of bits that can be transported together across a network. "Frame" should not be interpreted as limiting embodiments of the present invention to layer-2 networks. "Frame" can be replaced by other terminologies referring to a group of bits, such as "massage," "packet," "cell," or "datagram."

The term "switch" is used in a generic sense, and can refer to any standalone switch or switching fabric operating in any network layer. "Switch" should not be interpreted as limiting embodiments of the present invention to layer-2 networks. Any physical or virtual device (e.g., a virtual machine, which can be a virtual switch, operating on a computing device) that can forward traffic to an end device can be referred to as a "switch." Examples of a "switch" include, but not limited to, a layer-2 switch, a layer-3 router, or a TRILL RBridge.

Network Architecture

FIG. 1A illustrates an exemplary protected virtual link aggregation comprising virtual link aggregations, in accordance with an embodiment of the present invention. As illustrated in FIG. 1A, switches 102 and 104 in network 100 are coupled to end devices 112 and 114 via a protected virtual link aggregation 120. Here, switches 102 and 104 are partner switches of protected virtual link aggregation 120. In some embodiments, links in protected virtual link aggregation 120, which are coupled to an end device, are considered as a group. Protected virtual link aggregation 120 includes link aggregation group 122, which includes links to end device 112, and link aggregation group 124, which includes links to end device 114. In this example, groups 122 and 124, respectively, are virtual link aggregations, and couple end devices 112 and 114, respectively, with both switches 102 and 104.

In some embodiments, network 100 is a fabric switch, and switches 102, 104, and 106 are member switches of the fabric switch. In some further embodiments, a respective switch in the fabric switch is a TRILL RBridge. The fabric switch of network 100 appears as a single logical switch to end devices 112 and 114. The fabric switch of network 100 runs a control plane with automatic configuration capabilities (such as the Fibre Channel control plane) over a conventional transport protocol, thereby allowing a number of switches to be interconnected to form a single, scalable switch without requiring burdensome manual configuration. As a result, network 100 can form a large-scale switch using a number of smaller physical switches (e.g., switches 102, 104, and 106).

Each of groups 122 and 124 are configured to operate in a special "trunked" mode for end devices 112 and 114. End devices 112 and 114 view switches 102 and 104 as a common virtual switch 110, with a corresponding virtual switch identifier. Dual-homed end devices 112 and 114, which are coupled to more than one switch, are considered to be logically coupled to virtual switch 110 via logical links represented by dotted lines. Virtual switch 110 is considered to be logically coupled to both switches 102 and 104, optionally with zero-cost links (also represented by dotted lines). Incoming frames from end devices 112 and 114 are marked with virtual switch 110's identifier as their ingress switch identifier. As a result, other switches in network 100 learn that end devices 112 and 114 are both reachable via virtual switch 110. Furthermore, switches 102 and 104 can advertise their respective connectivity (optionally via zero-cost links) to virtual switch 110. Hence, multi-pathing can be achieved when other switches, such as switch 106, choose to send frames to virtual switch 110 (which are marked as the egress switch in the frames) via switches 102 and 104.

Since the two partner switches function as a single logical switch, the MAC address reachability learned by a respective partner switch is shared with the other partner switch. For example, during normal operation, end device 112 may choose to send its outgoing frames only via the link to switch 102. As a result, only switch 102 would learn end device 112's MAC address (and the corresponding port on switch 102 to which end station 112 is coupled). Switch 102 then shares this information with switch 104. Since the frames coming from end device 112 would have virtual switch 110's identifier as their ingress switch identifier, when other devices in the network send frames back to end device 112, these frames would have virtual switch 110's identifier as their egress switch identifier, and these frames might be sent to either switch 102 or 104. When switch 104 receives such a frame, it can determine that this frame can either be sent to locally coupled end device 112 or partner switch 102, based on the MAC reachability information shared by switch 102.

Links in groups 122 and 124 are configured as a single protected virtual link aggregation 120. In some embodiments, the protection switching feature should be enabled for protected virtual link aggregation 120. Otherwise, protected virtual link aggregation 120 can operate as a regular virtual link aggregation (e.g., with the protection switching feature disabled). It should be noted that virtual switch 110 is associated with a respective group in protected virtual link aggregation 120. In other words, both dual-homed end devices 112 and 114 can share the same virtual switch 110 for groups 122 and 124, respectively. As a result, frames from both end devices 112 and 114 are marked with virtual switch 110's identifier. This feature makes the present solution scalable, because when one of the groups is unavailable, the other group can continue the operations of protected virtual link aggregation 120. As a result, switch 106 can remain oblivious to the unavailability, and protected virtual link aggregation 120 can continue to operate without triggering information relearning or spanning tree reconstruction (e.g., based on Spanning Tree Protocol (STP), Rapid STP (RSTP), or Multiple STP (MSTP)) in network 100.

In addition, an end device is not required to change the way it is configured for a link aggregation. A dual-homed end device only needs to be configured to have an aggregate link to the virtual switch, as would be the case with a conventional, physical switch, using an existing link aggregation method. Hence, the dual-homed end device does not need to be aware that the virtual switch on the other end of the aggregate link is actually two physical switches. Furthermore, the rest of network 100 (apart from switches 102 and 104) is also not required to be aware that virtual switch 110 is actually not a physical switch. For example, to switch 106, virtual switch 110 can be indistinguishable from any of the physical switches. Therefore, the present invention does not require extra configuration to the rest of network 100.

When two end devices, such as end devices 112 and 114, are coupled to each other, these end devices can form a loop with network 100 via protected virtual link aggregation 120. As a result, end devices 112 and 114 can be considered as redundantly connected with network 100. A respective group separately couples network 100 with one of the redundant end devices. For example, group 122 couples end device 112 and group 124 couples end device 114 with network 100 via protected virtual link aggregation 120. One group operates as the primary or active group, and the other group(s) act as secondary or standby group(s).

Suppose that groups 122 and 124 are active and standby groups, respectively. Consequently, group 122 actively represents the logical channel corresponding to virtual link aggregation 120. In some embodiments, the active group exclusively represents the logical channel. During normal operation, forwarding via the ports participating in group 122 is enabled and via the ports participating in group 124 is logically disabled. Group 122 then carries traffic for protected virtual link aggregation 120 only from end device 112. For example, incoming frames from end device 112 via group 122 are marked with virtual switch 110's identifier as their ingress switch identifier.

In some embodiments, switches 102 and 104 are only aware of end device 112, which is coupled to network 100 via active group 122, among the redundant end device 112 and 114. If active group 122 becomes unavailable (e.g., due to a failure), protection switching is triggered, and standby group 124 takes over and starts forwarding traffic for protected virtual link aggregation 120. As a result, switches 102 and 104 automatically starts receiving traffic from the other redundant end device 114. In this way, group 124 becomes the new active group and continues traffic forwarding via protected virtual link aggregation 120. This allows protected virtual link aggregation 120 to continue to operate as the same logical channel. For example, upon becoming active, group 124 operates as if group 124 incoming frames from end device 114 via group 124 are marked with virtual switch 110's identifier as their ingress switch identifier.

Moreover, when active group 122 becomes unavailable during the protection switching, the status of protected virtual link aggregation 120 does not flap (e.g., protected virtual link aggregation 120 as a logical channel remain available). This precludes partner switches 102 and 104 from reprogramming the protocol configurations associated with protected virtual link aggregation 120. In other words, partner switches 102 and 104 can retain the protocol configurations associated with protected virtual link aggregation 120. For example, during the protection switching, layer-2/layer-3 information obtained via protected virtual link aggregation 120 are not flushed and relearned. This leads to a fast re-convergence after a protection switchover. Examples of such information include, but are not limited to, MAC address, which can be learned from layer-2 header processing, and/or multicast group association, which can be learned from Internet Group Management Protocol (IGMP) or Multicast Listener Discovery (MLD) snooping, of an end device.

In some embodiments, an active group can be configured (e.g., statically configured) by a user (e.g., a network administrator) for protected virtual link aggregation 120. This configuration allows the user to determine the links which carry traffic. Other group(s) of protected virtual link aggregation 120 operate as standby group(s). Links participating in the standby group(s) in partner switches 102 and 104 are maintained in an "operationally down" state. A link in the "operationally down" state operates as if the link is unplugged. As a result, the link is precluded from forwarding traffic. If protection switching is needed, links participating in the standby group(s) in partner switches 102 and 104 are switched to an "operationally up" state, wherein a link in the "operationally up" state operates as if the link is plugged and can forward traffic.

If an active group is not configured protected virtual link aggregation 120, one of groups 122 and 124 is dynamically selected as the active group based on a criterion. In some embodiments, the criterion indicates that the first group configured for protected virtual link aggregation 120 is dynamically selected as the active group. For example, if group 122 is configured before group 124 for protected virtual link aggregation 120, group 122 is dynamically selected as the active group. Links participating in the standby group(s) are maintained in a "standby" state (e.g., a multiplexer machine state indicating that the corresponding link is in a standby state). If a protection switching is needed, links participating in the standby group(s) can be rapidly switched to a "forwarding" state (e.g., a multiplexer machine state indicating that the corresponding link is in a collecting & distributing state).

In some embodiments, if group 122 is configured as the active group for protected virtual link aggregation 120, whenever group 122 is operating, traffic forwarding via group 124 is pre-empted. For example, if active group 122 is unavailable due to a failure, group 124 becomes active and starts forwarding traffic. When group 122 recovers from the failure and becomes available, traffic is reverted to group 122 from currently active group 124. Group 124 is then switched to being a standby group. On the other hand, in some embodiments, if group 122 is dynamically selected as the active group for protected virtual link aggregation 120, group 122 may not pre-empt traffic forwarding. For example, if dynamically selected active group 122 is unavailable due to a failure, group 124 becomes active and starts forwarding traffic. When group 122 recovers from the failure and becomes available, switches 102 and 104 continue to forward traffic via currently active group 124. After being available, group 122 becomes a standby group.

In some embodiments, protection switching can be triggered for protected virtual link aggregation 120 based on one or more criteria. Examples of such a criterion include, but are not limited to, minimum aggregate bandwidth and minimum number of active links. For example, if minimum number of active links is the criterion for triggering protection switching, a minimum number of active links is needed for group 122 or 124 to be the active group. Suppose that group 122 is the active group and the minimum number of active links is two. If at any point of time, group 122 does not have two active links (e.g., due to a link failure), the protection switching is triggered, and group 124 becomes the active group. This provides flexibility to a user to determine one or more criteria for triggering the protecting switching.

Figure 1B:
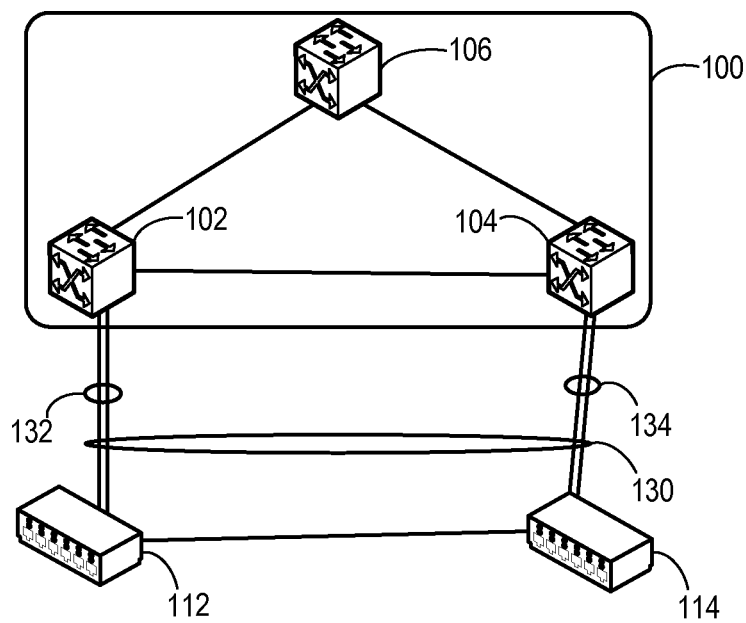
FIG. 1B illustrates an exemplary protected virtual link aggregation comprising link aggregations, in accordance with an embodiment of the present invention.

FIG. 1B illustrates an exemplary protected virtual link aggregation comprising link aggregations, in accordance with an embodiment of the present invention. In the example in FIG. 1B, switches 102 and 104 in network 100 are coupled to end devices 112 and 114 via protected virtual link aggregation 130. Here, switches 102 and 104 are partner switches of protected virtual link aggregation 130. Because links in protected virtual link aggregation 130, which are coupled to an end device, are considered as a group, the link aggregation between switch 102 and end device 112 forms a link aggregation group 132, and the link aggregation between switch 104 and end device 114 forms a link aggregation group 134.

As described in conjunction with FIG. 1A, one of groups 132 and 134 operates as the active group and the other group operates as the standby group. When the active group becomes unavailable, the standby group starts operating as the active group. This allows partner switches 102 and 104 to retain the protocol configurations associated with protected virtual link aggregation 130. For example, during the protection switching, layer-2/layer-3 information obtained via protected virtual link aggregation 130 are not flushed and relearned. Hence, a protected virtual link aggregation can be constructed based on link aggregations between individual switches and redundant end devices, without requiring the end device to have a virtual link aggregation with a plurality of switches.

Enabling a Protected Virtual Link Aggregation

In the example in FIG. 1A, protected virtual link aggregation 120 is formed by incorporating link aggregation groups 122 and 124 coupled to redundant end devices 112 and 114, respectively. Among groups 122 and 124, one is selected as the active group, which is responsible for forwarding traffic via protected virtual link aggregation 120, and the other is selected as the standby group. An active group can be configured, or dynamically selected.

Figure 2:
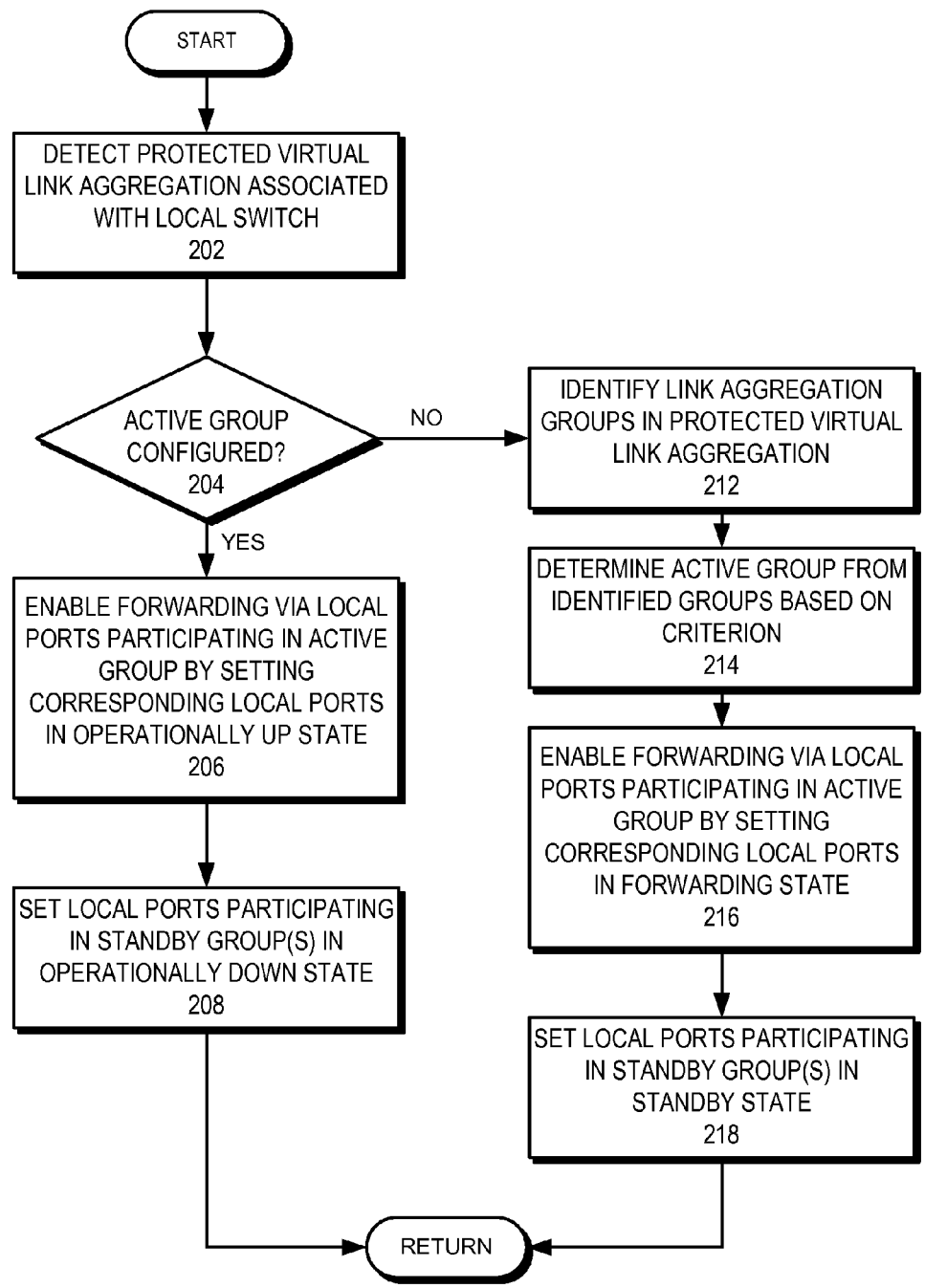
FIG. 2 presents a flowchart illustrating the process of a partner switch of a protected virtual link aggregation enabling an active group of the protected virtual link aggregation, in accordance with an embodiment of the present invention.

FIG. 2 presents a flowchart illustrating the process of a partner switch of a protected virtual link aggregation enabling an active group of the protected virtual link aggregation, in accordance with an embodiment of the present invention. During operation, the switch detects a protected virtual link aggregation associated with the local switch (operation 202). In some embodiments, a user configures the protected virtual link aggregation for the switch, which, in turn, detects the protected virtual link aggregation based on the configuration. The switch then checks whether an active group is configured (operation 204). If so, the switch enables forwarding via the local ports (i.e., ports in the switch) participating in the active group by setting the corresponding local ports in an operationally up state (operation 206). The switch sets the local ports participating in the standby group(s) (e.g., groups other than the active group) in an operationally down state (operation 208).

If an active group is not configured for the protected virtual link aggregation, the active group is dynamically selected. The switch then identifies the link aggregation groups in the protected virtual link aggregation (operation 212). The switch determines the active group from the identified group based on a criterion (operation 214). In some embodiments, the criterion indicates that the group first configured in the protected virtual link aggregation is selected as the active group. The switch then enables forwarding via the local ports participating in the active group by setting the corresponding local ports in a forwarding state (e.g., a multiplexer machine state indicating that the corresponding links are in a collecting & distributing state) (operation 216). The switch sets the local ports participating in the standby group(s) in a standby state (e.g., a multiplexer machine state indicating that the corresponding links are in a standby state) (operation 218).

Forwarding Via a Protected Virtual Link Aggregation

Figure 3A:
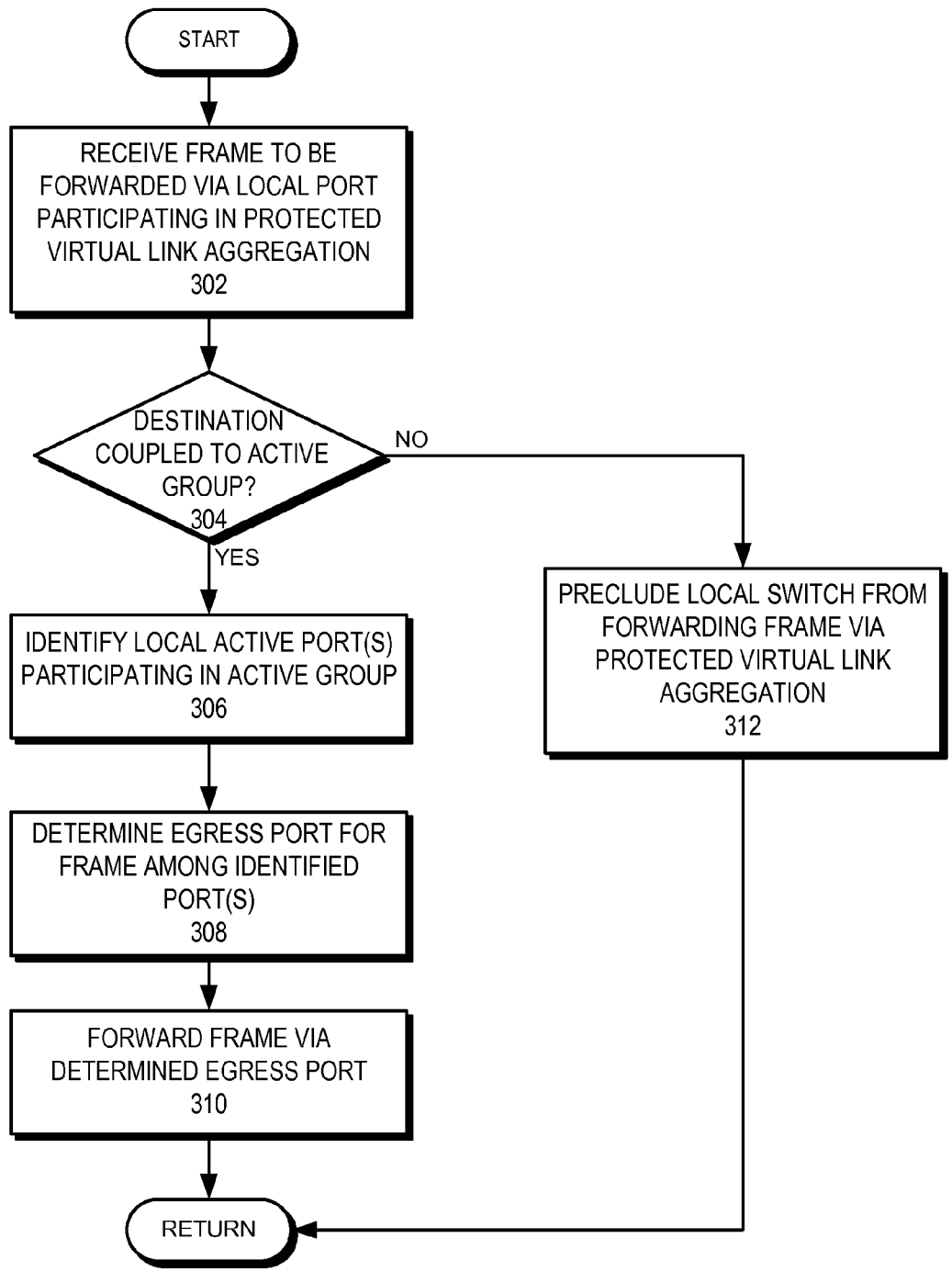
FIG. 3A presents a flowchart illustrating the process of a partner switch of a protected virtual link aggregation forwarding a frame via the protected virtual link aggregation, in accordance with an embodiment of the present invention.

FIG. 3A presents a flowchart illustrating the process of a partner switch of a protected virtual link aggregation forwarding a frame via the protected virtual link aggregation, in accordance with an embodiment of the present invention. During operation, the switch receives a frame to be forwarded via the protected virtual link aggregation (operation 302) and checks whether the destination is coupled to an active group (operation 304). In the example in FIG. 1A, such a frame can be received by partner switch 102 from switch 106. If group 122 is the active group, switch 102 checks whether the destination is coupled to group 122 (e.g., destination is reachable via group 122).

If the destination is coupled to the active group, the switch identifies the local active ports (e.g., ports in a "forwarding" or "operationally up" state, as described in conjunction with FIG. 1A) participating in the active group (operation 306). The switch determines an egress port for the frame among the identified ports (operation 308) and forwards the frame via the determined egress port (operation 310). If the destination is not coupled to the active group (e.g., coupled to a standby group), the switch precludes the local switch from forwarding the frame via the protected virtual link aggregation (operation 312). In the example of FIG. 1A, if group 122 is the active group and the destination of such a frame is coupled to group 124, switch 102 or 104 precludes itself from forwarding the frame via protected virtual link aggregation 120. In some embodiments, such a frame can be dropped.

Figure 3B:
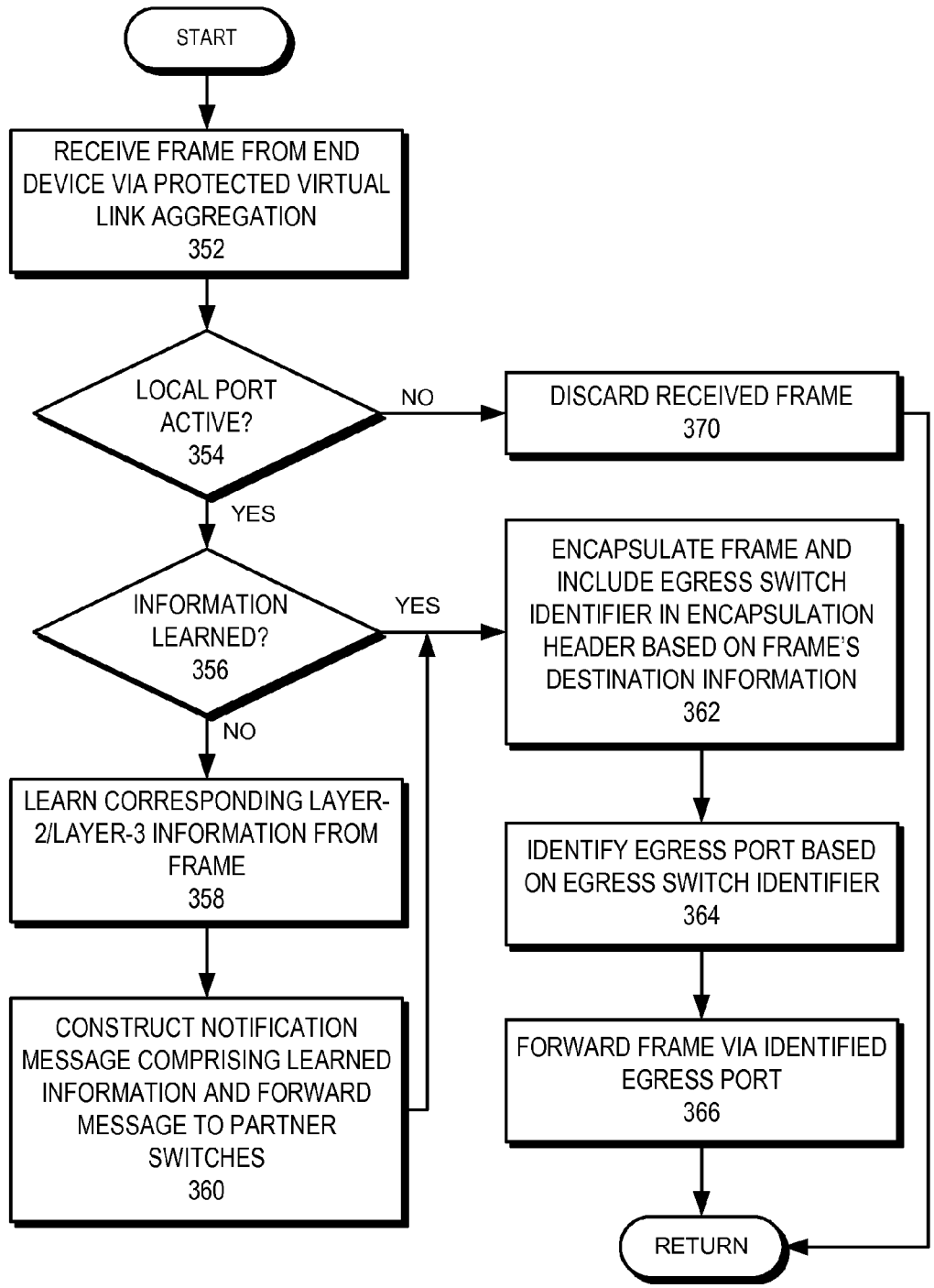
FIG. 3B presents a flowchart illustrating the process of a partner switch of a protected virtual link aggregation forwarding a frame received via the protected virtual link aggregation, in accordance with an embodiment of the present invention.

FIG. 3B presents a flowchart illustrating the process of a partner switch of a protected virtual link aggregation forwarding a frame received via the protected virtual link aggregation, in accordance with an embodiment of the present invention. During operation, the switch receives a frame from an end device via a local port participating in the protected virtual link aggregation (operation 352) and checks whether the local port(s) are active (operation 354). If the local port is not active (e.g., the port is in a "standby" or "operationally down" state, as described in conjunction with FIG. 1A), the switch discards (i.e., drops) the received frame (operation 370). Note that the switch can drop the frame at the ingress port.

If the local port is active, the switch checks whether the information associated with the frame has already been learned (operation 356). For example, the switch checks whether the source MAC address of the frame has been learned. Even though some information associated with the frame can already be learned, some other information may not be learned. For example, if the frame includes an IGMP join message, layer-2 information, such as the source MAC address, of the frame may already be learned, but layer-3 information, such as the multicast group association, may not be learned. If any information associated with the frame is not learned, the switch learns the corresponding layer-2/layer-3 information from the frame (operation 358), and then constructs a notification message comprising the learned information and forwards the notification message to the partner switches (operation 360). In some embodiments, the notification message is a name service message of a fabric switch. This notification message can be encapsulated in a TRILL header.

If information associated with the frame has already been learned (operation 356) or the notification message has been forwarded to partner switches (operation 360), the switch encapsulates the frame and includes an egress switch identifier in the encapsulation header based on the frame's destination information (operation 362). In some embodiments, the switch encapsulates the frame in a TRILL packet, and includes an RBridge identifier as the egress switch identifier in the TRILL header. The switch then identifies an egress port based on the egress switch identifier (operation 364) and forwards the frame via the identified egress port (operation 366). If the frame is encapsulated in a TRILL header, the identified egress port can correspond to an egress RBridge.

Protection Switching

Figure 4:
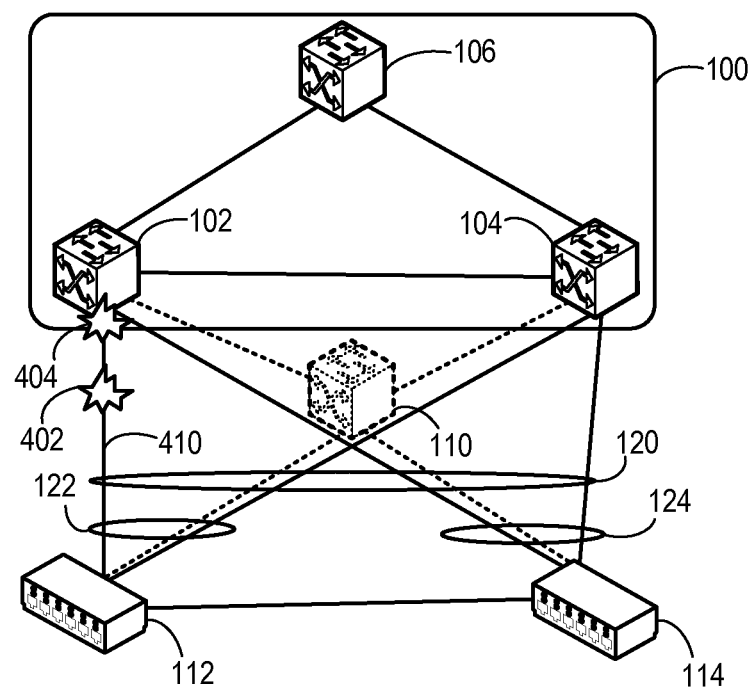
FIG. 4 illustrates exemplary unavailability scenarios of a protected virtual link aggregation, in accordance with an embodiment of the present invention.

Network scenarios often change, leading to unavailability of links and nodes in the network. A port of a switch can fail or a switch can be taken off of a network because of maintenance. During such unavailability, the protected virtual link aggregation can provide protection switching and continue to operate without triggering a learned information flush or spanning tree reconstruction. FIG. 4 illustrates exemplary unavailability scenarios of a protected virtual link aggregation, in accordance with an embodiment of the present invention. During operation, group 122 becomes the active group (based on either configuration or dynamic selection). As a result, partner switches 102 and 104 forward traffic via the links (i.e., ports) participating in group 122 and preclude themselves from forwarding via the links participating in group 124.

Suppose that link 410 between switch 102 and end device 112 becomes unavailable due to failure 402. If the criterion for triggering protection switching is the minimum number of active links and the minimum number is two, group 122 no longer meets the criterion due to the unavailability of link 410. As a result, protection switching for protected virtual link aggregation 120 is triggered. Similarly, if switch 102 becomes unavailable due to failure 404, link 410 becomes unavailable, and protection switching for protected virtual link aggregation 120 is triggered.

As a result, standby group 124 takes over as the active group and starts representing the logical channel corresponding to protected virtual link aggregation 120. Group 124 then starts forwarding traffic for protected virtual link aggregation 120. This allows group 124 to continue to represent the logical channel corresponding to protected virtual link aggregation 120. For example, upon becoming active, incoming frames from end device 114 via group 124 are marked with virtual switch 110's identifier as their ingress switch identifier. As a result, even during failure 402 or 404, switch 106 can remain oblivious to the failure, and protected virtual link aggregation 120 can continue to operate without triggering a learned information flush or spanning tree reconstruction in network 100.

In some embodiments, if group 122 is configured as the active group for protected virtual link aggregation 120, group 122 can pre-empt traffic forwarding via group 124. For example, when link 410 or switch 102 recovers from failure 402 or 404, respectively, group 122 becomes available. Traffic is then reverted to group 122 from currently active group 124, which is switched to being a standby group. On the other hand, in some embodiments, if group 122 is dynamically selected as the active group for protected virtual link aggregation 120, group 122 may not pre-empt traffic forwarding. For example, when link 410 or switch 102 recovers from failure 402 or 404, respectively, group 122 becomes available. However, switches 102 and 104 continue to forward traffic via currently active group 124. After being available, group 122 becomes a standby group.

Figure 5A:
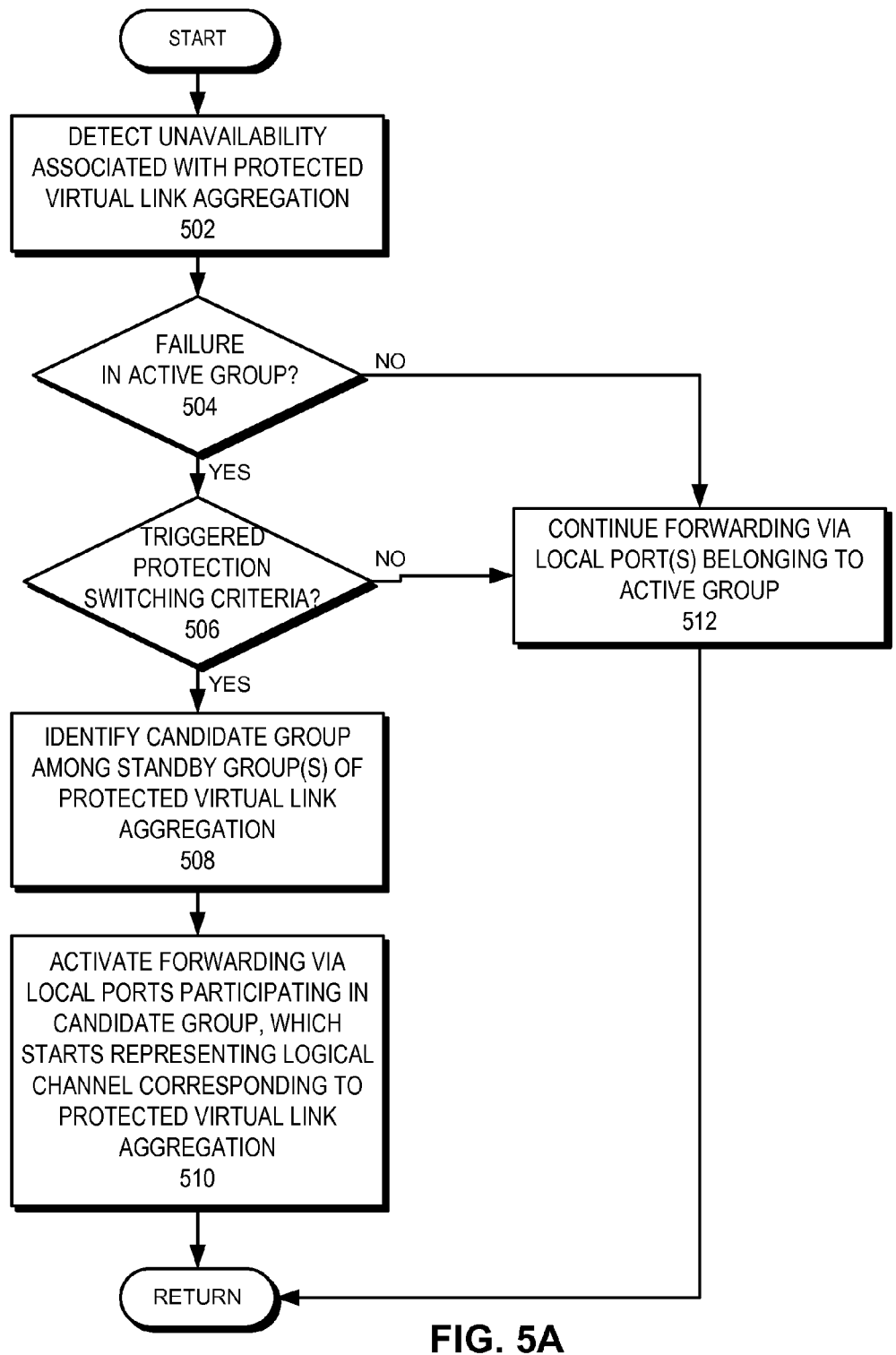
FIG. 5A presents a flowchart illustrating the process of a partner switch of a protected virtual link aggregation handling unavailability, in accordance with an embodiment of the present invention.

FIG. 5A presents a flowchart illustrating the process of a partner switch of a protected virtual link aggregation handling unavailability, in accordance with an embodiment of the present invention. During operation, the switch detects an unavailability associated with a protected virtual link aggregation (operation 502) and checks whether the unavailability is associated with the active group (operation 504). If the unavailability is associated with the active group, the switch checks whether the unavailability has triggered the protection switching criterion (operation 506), as described in conjunction with FIG. 4. Examples of the criterion include, but are not limited to, minimum aggregate bandwidth and minimum number of active links. If the unavailability is not associated with the active group (operation 504) or the criterion has not been triggered (operation 506), the switch continues forwarding traffic via local port(s) belonging to the active group (operation 512).

If the unavailability has triggered the protection switching criteria, the switch identifies the candidate group among standby group(s) of the protected virtual link aggregation (operation 508). This candidate group is next in line among the standby groups for becoming the active group. The switch then activates forwarding via the local ports participating in the candidate group, which starts representing the logical channel corresponding to the protected virtual link aggregation (operation 510). In some embodiments, enabling forwarding entails setting the ports in a "forwarding" or "operationally up" state, as described in conjunction with FIG. 1A. As a result, other switches of the network can remain oblivious to the unavailability and the protected virtual link aggregation can continue to operate.

Figure 5B:
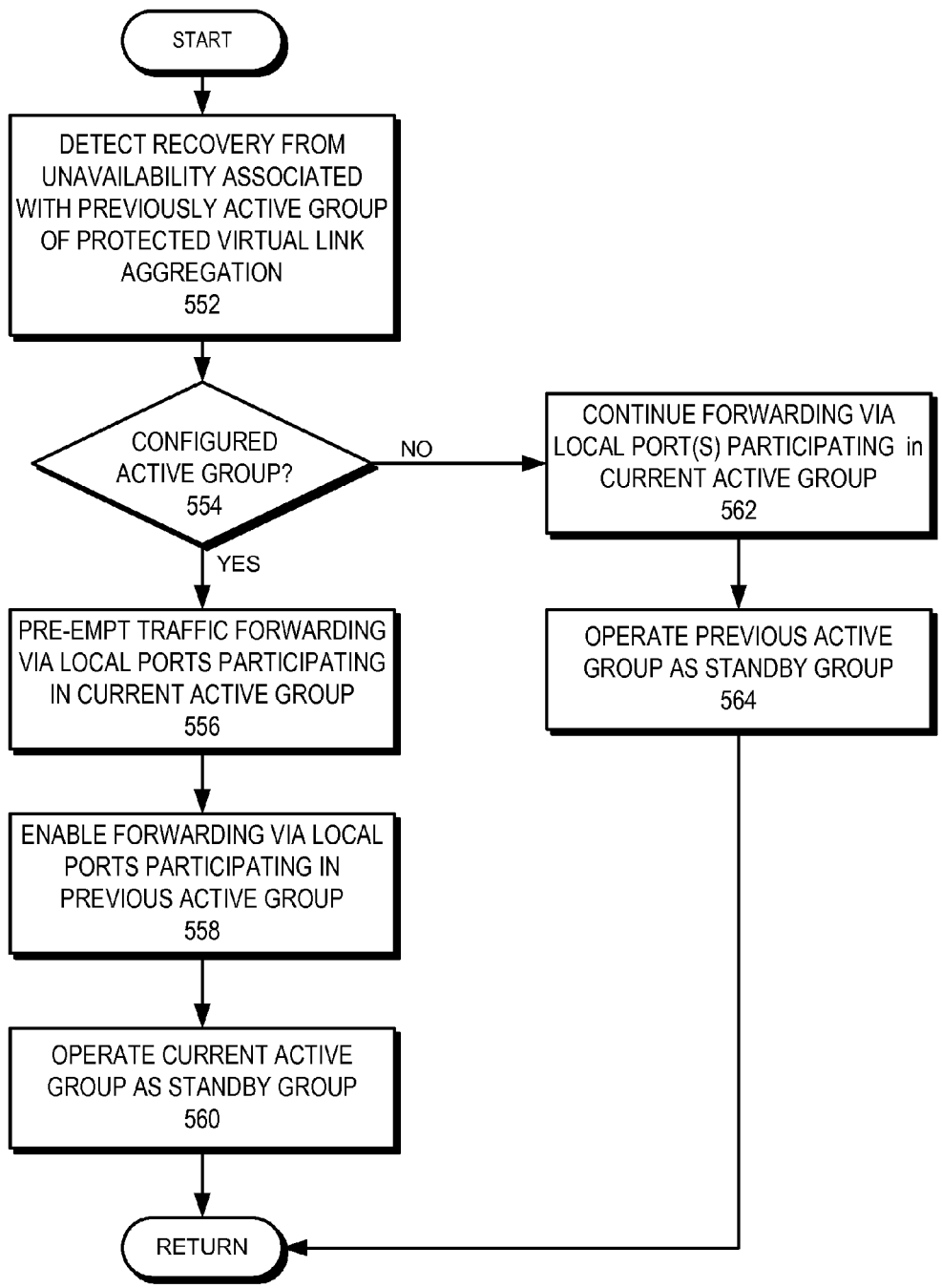
FIG. 5B presents a flowchart illustrating the process of a partner switch of a protected virtual link aggregation recovering from unavailability, in accordance with an embodiment of the present invention.

FIG. 5B presents a flowchart illustrating the process of a partner switch of a protected virtual link aggregation recovering from unavailability, in accordance with an embodiment of the present invention. During operation, the switch detects recovery from unavailability associated with previously active group of the protected virtual link aggregation (operation 552) and checks whether the previous active group is a configured active group (operation 554). If the previous active group is not a configured active group (e.g., a dynamically selected active group), the switch continues forwarding via the local ports participating in the current active group (operation 562) and operates the previous active group as a standby group (operation 564), as described in conjunction with FIG. 2. In some embodiments, operating the previous active group as a standby group entails setting the ports of the previous active group in a "standby" state, as described in conjunction with FIG. 1A.

If the previous active group is a configured active group, the switch pre-empts traffic forwarding via the local ports participating in the current active group (operation 556). The switch then activates forwarding via the local ports participating in the previous active group of the protected virtual link aggregation (operation 558). In some embodiments, enabling forwarding entails setting the ports in an "operationally up" state, as described in conjunction with FIG. 1A. The switch then operates the current active group as a standby group of the protected virtual link aggregation (operation 560), as described in conjunction with FIG. 2. In some embodiments, operating the current active group as a standby group entails setting the ports of the current active group in an "operationally down" state, as described in conjunction with FIG. 1A.

Exemplary Switch

Figure 6:
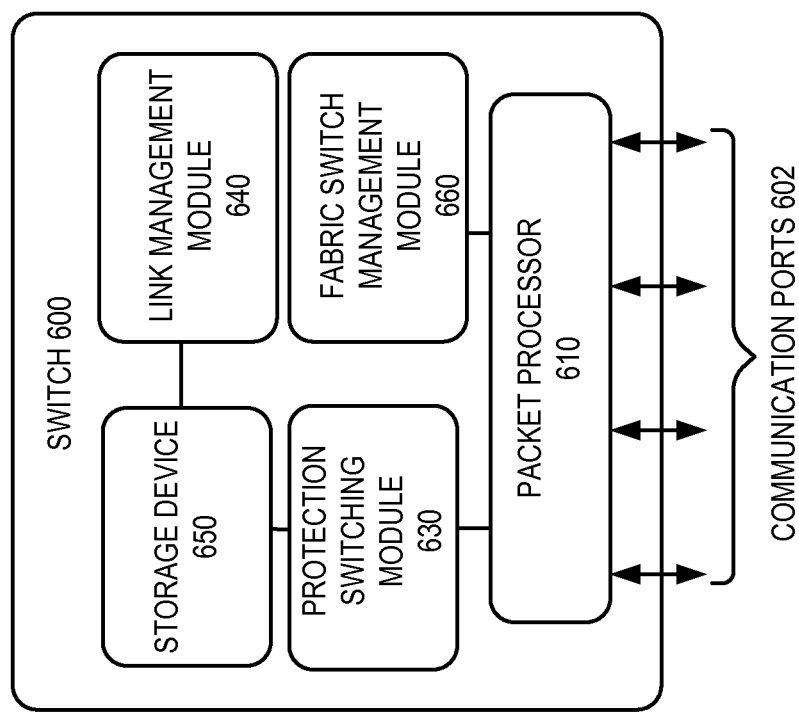
FIG. 6 illustrates an exemplary architecture of a switch with protected virtual link aggregation support, in accordance with an embodiment of the present invention.

FIG. 6 illustrates an exemplary architecture of a switch with protected virtual link aggregation support, in accordance with an embodiment of the present invention. In this example, a switch 600 includes a number of communication ports 602, a packet processor 610, a link management module 640, and a storage device 650. Packet processor 610 extracts and processes header information from the received frames.

In some embodiments, switch 600 may maintain a membership in a fabric switch, wherein switch 600 also includes a fabric switch management module 660. Fabric switch management module 660 maintains a configuration database in storage device 650 that maintains the configuration state of every switch within the fabric switch. Fabric switch management module 660 maintains the state of the fabric switch, which is used to join other switches. In some embodiments, switch 600 can be configured to operate in conjunction with a remote switch as an Ethernet switch. Under such a scenario, communication ports 602 can include inter-switch communication channels for communication within a fabric switch. This inter-switch communication channel can be implemented via a regular communication port and based on any open or proprietary format. Communication ports 602 can include one or more TRILL ports capable of receiving frames encapsulated in a TRILL header. Packet processor 610 can process these TRILL-encapsulated frames.

During operation, link management module 640 operates a first group of a protected virtual link aggregation as an active group. The first group comprises at least a first port of communication ports 602. Link management module 640 also operates a second group of the protected virtual link aggregation as the standby for the first group. The second group comprises at least a second port of communication ports 602. Forwarding is enabled via the first port and disabled via the second port. Link management module 640 can determine the first group as the active group based configuration and/or dynamic selection, as described in conjunction with FIG. 2. In some embodiments, link management module 640 operates the first and the second groups as virtual link aggregations in conjunction with a remote switch.

In some embodiments, switch 600 also includes a protection switching module 630, which detects an unavailability associated with the first group based on an unavailability criterion. The unavailability criterion is based on minimum number of active links and/or minimum aggregate bandwidth of a group. Upon detecting the unavailability, protection switching module 630 enables forwarding via the second port. Consequently, the second group starts representing the logical channel corresponding to the protected virtual link aggregation, as described in conjunction with FIG. 5A. Upon detecting a recovery from the unavailability, protection switching module 630 either continues to operate the second group as the active group or reverts back to the first group as the active group, as described in conjunction with FIG. 5B.

Note that the above-mentioned modules can be implemented in hardware as well as in software. In one embodiment, these modules can be embodied in computer-executable instructions stored in a memory which is coupled to one or more processors in switch 600. When executed, these instructions cause the processor(s) to perform the aforementioned functions.

In summary, embodiments of the present invention provide a switch, a method and a system for protection switching over a virtual link aggregation. In one embodiment, the switch comprises one or more ports and a link management module. The link management module operates a first aggregate link group as an active aggregate link group of a protected virtual link aggregation. This protected virtual link aggregation operates as a single logical channel. An aggregate link group comprises a plurality of logically aggregated links. The first aggregate link group, which represents the logical channel, comprises at least a first port of the one or more ports of the switch. The link management module also operates a second aggregate link group of the protected virtual link aggregation as a standby for the first aggregate link group. The second aggregate link group comprises at least a second port of the one or more ports of the switch. Forwarding is enabled via the first port and disabled via the second port.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
   one or more ports;
   a link management module configured to:
      operate a protected virtual link aggregation group as a protected logical channel, wherein the protected virtual link aggregation group comprises a first and a second aggregate link groups, and wherein an aggregate link group comprises a plurality of aggregated links operating as a logical channel;
      operate the first aggregate link group as an active aggregate link group of the protected virtual link aggregation, wherein the first aggregate link group comprises at least a first port of the one or more ports of the switch, and wherein forwarding is enabled via the first port; and
      operate the second aggregate link group of the protected virtual link aggregation as a standby for the first aggregate link group, wherein the second aggregate link group comprises at least a second port of the one or more ports of the switch, and wherein forwarding is disabled via the second port;
   wherein, in response to being operational, the logical channel of the first aggregate link group represents the protected logical channel.

2. The switch of claim 1, wherein a respective aggregate link group is a virtual link aggregation group coupled to the switch and a remote switch, wherein the virtual link aggregation group operates as a logical channel.

3. The switch of claim 1, wherein the link management module is further configured to determine the first aggregate link group as the active aggregate link group based on one or more of:
   a configuration of the first aggregate link group as the active aggregate link group; and
   a dynamic selection of the first aggregate link group as the active aggregate link group based on a criterion.

4. The switch of claim 1, wherein the first and second aggregate link groups are coupled to a first and a second end devices, respectively.

5. The switch of claim 1, wherein forwarding is enabled via the first port based on one or more of:
   setting the first port in a forwarding state; and
   setting the first port in an operationally up state;
and wherein forwarding is disabled via the second port based on one or more of:
   setting the second port in a standby state; and
   setting the second port in an operationally down state.

6. The switch of claim 1, further comprising a protection switching module configured to:
   detect an unavailability associated with the first aggregate link group based on an unavailability criterion; and
   in response to detecting the unavailability, enable forwarding via the second port, thereby enabling traffic forwarding via the second aggregate link group, wherein the logical channel of the second aggregate link group starts representing the protected logical channel.

7. The switch of claim 6, wherein the unavailability criterion is based on one or more of:
   minimum number of active link in a link aggregation group; and
   minimum aggregate bandwidth of a link aggregation group.

8. The switch of claim 6, in response to detecting a recovery from the unavailability, the protection switching module is further configured to:
   preemptively divert traffic from the second port;
   enable forwarding via the first port, thereby enabling traffic forwarding via the first aggregate link group; and
   disable forwarding via the second port, thereby disabling traffic forwarding via the second aggregate link group.

9. The switch of claim 6, in response to detecting a recovery from the unavailability, the protection switching module is further configured to:
   continue forwarding via the second port, wherein the logical channel of the second link aggregation group continues to represent the protected logical channel; and
   operate the first aggregate link group as a standby for the second aggregate link group, wherein forwarding is disabled via the first port.

10. The switch of claim 1, wherein the switch is a member of a network of interconnected switches;
   wherein the switch is associated with an identifier of the network of interconnected switches; and
   wherein the network of interconnected switches is controlled as a single logical switch.

11. A method, comprising:
   operating a protected virtual link aggregation group as a protected logical channel, wherein the protected virtual link aggregation group comprises a first and a second aggregate link groups, and wherein an aggregate link group comprises a plurality of aggregated links operating as a logical channel;
   operating the first aggregate link group as an active aggregate link group of a protected virtual link aggregation group, wherein the first aggregate link group comprises at least a first port of a switch, and wherein forwarding is enabled via the first port; and
   operate the second aggregate link group of the protected virtual link aggregation as a standby for the first aggregate link group, wherein the second aggregate link group comprises at least a second port of the switch, and wherein forwarding is disabled via the second port;

wherein, in response to being operational, the logical channel of the first group represents the protected logical channel.

12. The method of claim 11, wherein a respective aggregate link group is a virtual link aggregation group coupled to the switch and a remote switch, wherein the virtual link aggregation group operates as a logical channel.

13. The method of claim 11, further comprising determining the first aggregate link group as the active aggregate link group based on one or more of:
   a configuration of the first aggregate link group as the active aggregate link group; and
   a dynamic selection of the first aggregate link group as the active aggregate link group based on a criteria.

14. The method of claim 11, wherein the first and second aggregate link groups are coupled to a first and a second end devices, respectively.

15. The method of claim 11, wherein forwarding is enabled via the first port based on one or more of:
   setting the first port in a forwarding state; and
   setting the first port in an operationally up state;
and wherein forwarding is disabled via the second port based on one or more of:
   setting the second port in a standby state; and
   setting the second port in an operationally down state.

16. The method of claim 11, further comprising:
   detecting an unavailability associated with the first aggregate link group based on an unavailability criterion; and
   in response to detecting the unavailability, enabling forwarding via the second port, thereby enabling traffic forwarding via the second aggregate link group, wherein the logical channel of the second aggregate link group starts representing the protected logical channel.

17. The method of claim 16, wherein the unavailability criterion is based on one or more of:
   minimum number of active link in a link aggregation group; and
   minimum aggregate bandwidth of a link aggregation group.

18. The method of claim 16, in response to detecting a recovery from the unavailability, further comprising:
   preemptively divert traffic from the second port;
   enabling forwarding via the first port, thereby enabling traffic forwarding via the first aggregate link group; and
   disabling forwarding via the second port, thereby disabling traffic forwarding via the second aggregate link group.

19. The method of claim 16, in response to detecting a recovery from the unavailability, further comprising:
   continuing forwarding via the second port, wherein the logical channel of the second link aggregation group continues to represent the protected logical channel; and
   operating the first aggregate link group as a standby for the second aggregate link group, wherein forwarding is disabled via the first port.

20. The method of claim 11, wherein the switch is a member of a network of interconnected switches;
   wherein the switch is associated with an identifier of the network of interconnected switches; and
   wherein the network of interconnected switches is controlled as a single logical switch.

21. A system, comprising:
   one or more ports;
   a processor;
   a memory storing instructions that when executed by the processor cause the system to perform a method, the method comprising:
      operating a protected virtual link aggregation group as a protected logical channel, wherein the protected virtual link aggregation group comprises a first and a second aggregate link groups, and wherein an aggregate link group comprises a plurality of aggregated links operating as a logical channel;
      operating the first aggregate link group as an active aggregate link group of a protected virtual link aggregation group, wherein the first aggregate link group comprises at least a first port of the one or more ports of the system, and wherein forwarding is enabled via the first port; and
      operating the second aggregate link group of the protected virtual link aggregation as a standby for the first aggregate link group, wherein the second aggregate link group comprises at least a second port of the one or more ports of the system, and wherein forwarding is disabled via the second port;
   wherein, in response to being operational, the logical channel of the first group represents the protected logical channel.

* * * * *